United States Patent
Rossmann (10) Patent No.: US 7,739,290 B2
(45) Date of Patent: Jun. 15, 2010

(54) SYSTEM AND METHOD FOR OBJECT PERSISTENCE

(75) Inventor: Albert P. Rossmann, Wiesloch (DE)

(73) Assignee: SAP (AG), Walldorf (DE)

( * ) Notice: Subject to any disclaimer, the term of this patent is extended or adjusted under 35 U.S.C. 154(b) by 381 days.

(21) Appl. No.: 11/015,102

(22) Filed: Dec. 17, 2004

(65) Prior Publication Data

US 2006/0136464 A1 Jun. 22, 2006

(51) Int. Cl.
*G06F 17/30* (2006.01)
(52) U.S. Cl. ............... 707/755; 707/661; 707/687; 707/821; 707/813; 707/790; 707/674; 707/604; 709/223; 709/253; 717/102; 717/114; 717/116
(58) Field of Classification Search .............. 707/4, 707/103 R, 103 X, 103 Y, 8, 9, 10, 101, 104.1, 707/203, 204; 709/223, 253; 717/102, 114, 717/116
See application file for complete search history.

(56) References Cited

U.S. PATENT DOCUMENTS

| | | | | |
|---|---|---|---|---|
| 5,752,249 A * | 5/1998 | Macon et al. | ........... | 707/103 R |
| 6,122,627 A * | 9/2000 | Carey et al. | ........... | 707/4 |
| 6,553,383 B1 * | 4/2003 | Martin | ........... | 707/102 |
| 6,615,253 B1 * | 9/2003 | Bowman-Amuah | ........... | 709/219 |
| 6,769,124 B1 * | 7/2004 | Schoening et al. | ........... | 719/316 |
| 6,778,983 B1 * | 8/2004 | Bates et al. | ........... | 707/4 |
| 2002/0165995 A1 * | 11/2002 | Matula et al. | ........... | 709/316 |
| 2003/0046266 A1 * | 3/2003 | Mullins et al. | ........... | 707/1 |
| 2003/0056022 A1 * | 3/2003 | Carlson et al. | ........... | 709/315 |
| 2003/0088604 A1 * | 5/2003 | Kuck et al. | ........... | 709/1 |
| 2003/0105883 A1 * | 6/2003 | Gibbons | ........... | 709/313 |
| 2003/0200526 A1 * | 10/2003 | Arcand | ........... | 717/102 |
| 2004/0039800 A1 * | 2/2004 | Black et al. | ........... | 709/220 |
| 2004/0205771 A1 * | 10/2004 | Sudarshan et al. | ........... | 719/316 |

* cited by examiner

*Primary Examiner*—Khanh B Pham
*Assistant Examiner*—Syling Yen
(74) *Attorney, Agent, or Firm*—Blakely, Sokoloff, Taylor & Zafman LLP (57) ABSTRACT

Embodiments of the invention are generally directed to a system and method for object persistence. In an embodiment, a proxy object is created based, at least in part, on object metadata stored in an internal data store of a persistence manager. The persistence manager may receive a request to access member data of a persistent object associated with the proxy object. In one embodiment, the persistence manager provides the member data from the proxy object.

34 Claims, 6 Drawing Sheets

SYSTEM AND METHOD FOR OBJECT PERSISTENCE

TECHNICAL FIELD

Embodiments of the invention generally relate to the field of data processing and, more particularly, to a system and method for managing persistence in an object-oriented environment.

BACKGROUND

Many software applications (or simply, applications) are developed from an object-oriented point-of-view. These applications consist of "objects" that are self-contained modules of data and associated processing. There is frequently a need to store object data in a persistent data store. Typically, a relational database is used to provide the persistent data store because the technology for relational databases is mature and is widely available.

Figure 1:
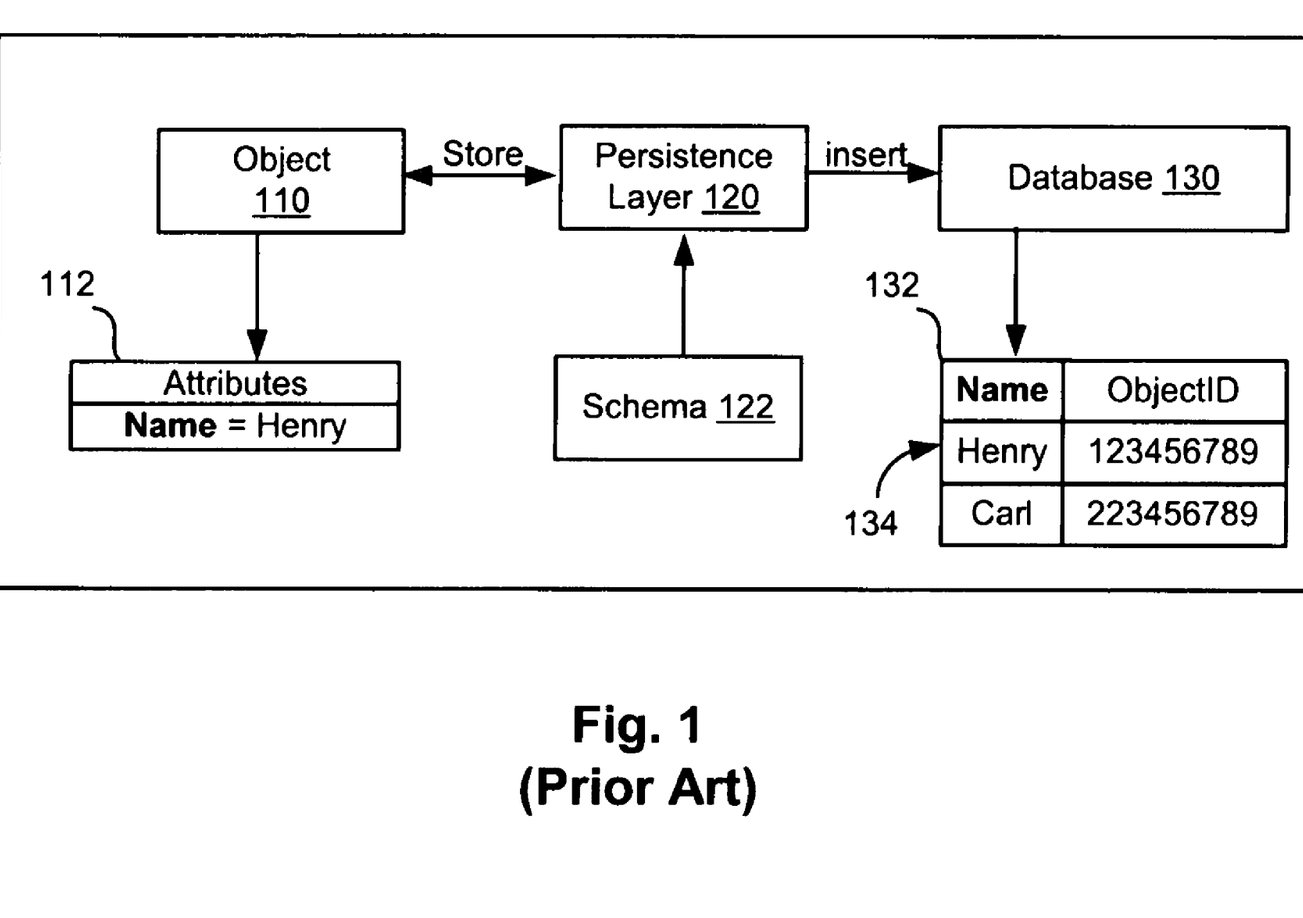
FIG. 1 is a block diagram of selected aspects of a conventional approach for storing object data on a relational database.

FIG. 1 is a block diagram of selected aspects of a conventional approach for storing object data on a relational database. Object 110 is a software object developed according to an object-oriented programming language such as Java, C++, and the like. Object 110 includes persistent data such as attribute 112. An "attribute" is a data element that specifies a characteristic of object 110. Relational database 130 stores data (e.g., in table 132) using an organizational model that is based on set-oriented query and update statements.

Persistence layer 120 maps the object-oriented domain of object 110 to the relational domain of database 130. Typically persistence layer 120 includes an object-relational schema 122 to define the mapping between the object-oriented domain and the relational domain. For example, schema 122 specifies that attribute 112 is mapped to row 134 of table 132.

There are a number of disadvantages to the conventional approach for storing object data on a relational database. First, the conventional approach of saving and restoring the attributes of each single object is not suitable for mass data transfers. Also, the conventional approach limits the use of database views because schema 122 provides a fixed mapping between objects and tables. The conventional approach also involves the additional administrative overhead of generating schema 122. Finally, the traditional approach does not distribute persistence and transaction management in distributed systems.

SUMMARY OF THE INVENTION

Embodiments of the invention are generally directed to a system and method for object persistence. In an embodiment, a proxy class is created based on object metadata stored in the relational database. The set of all proxy classes is part of the persistence manager runtime and replaces the interface definition language (IDL), which facilitates communication between applications. In an embodiment, this is the basis for distributed caches and distributed applications. The persistence manager may receive a request to access member data of a persistent object associated with the proxy object. In one embodiment, the persistence manager provides the member data from the proxy object in an internal table, with one row entry for each object.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for object persistence. In an embodiment, a proxy class is created based on the metadata stored in the relational database. The persistence manager may receive a request to access member data of a persistent object associated with the proxy object. In one embodiment, the persistence manager provides the member data from the proxy object in an internal table, with one row entry for each object.

Figure 2:
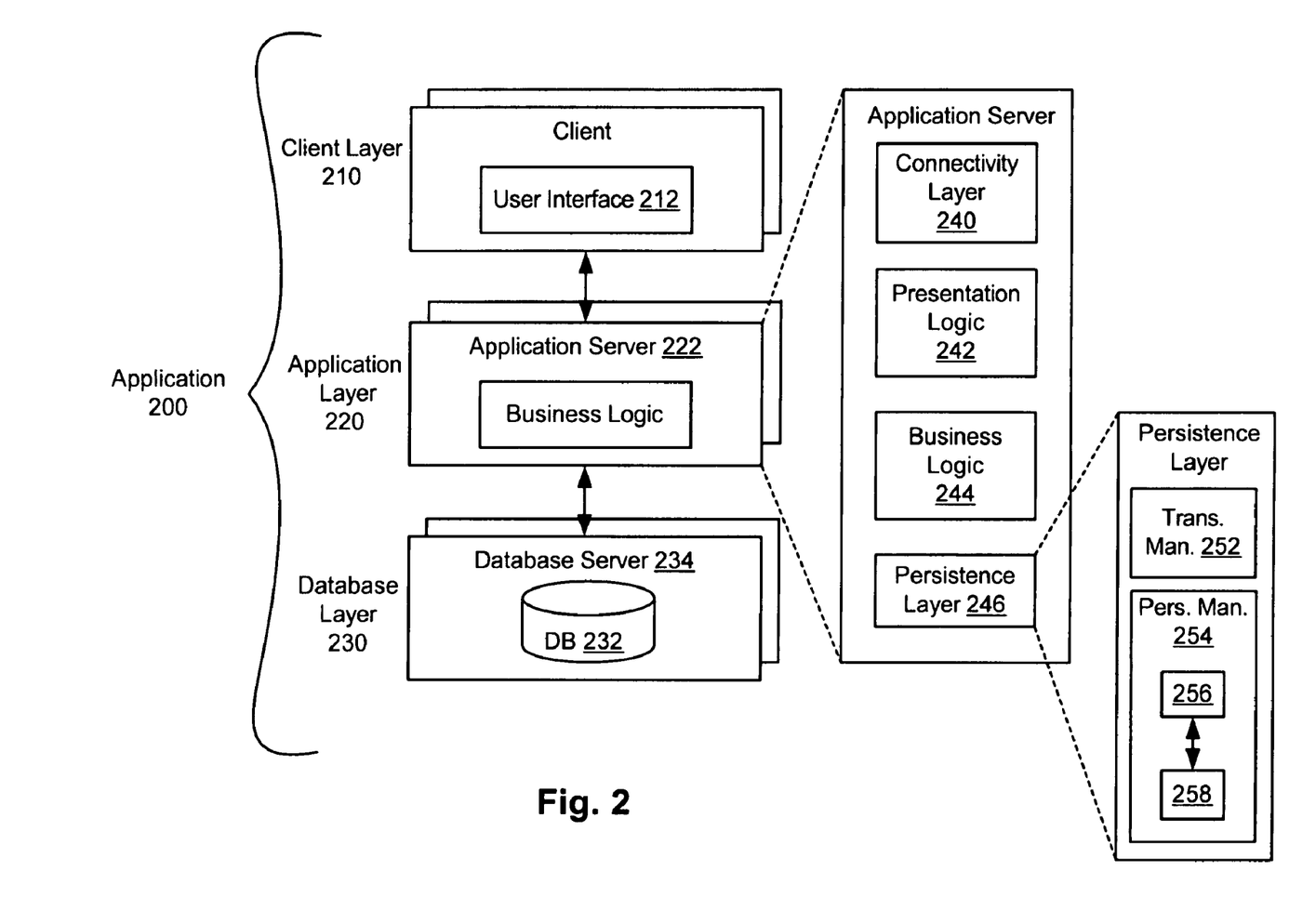
FIG. 2 is a block diagram of selected aspects of an application having object persistence according to an embodiment of the invention.

FIG. 2 is a block diagram of selected aspects of application 200 having object persistence according to an embodiment of the invention. In an embodiment, application 200 may be part of a multi-tiered network. The multi-tiered network may be implemented using a variety of different application technologies at each of the layers of the multi-tier architecture, including those based on the Java 2 Enterprise Edition™ ("J2EE") platform, the Microsoft NET platform, the Websphere platform developed by IBM Corporation, and/or the Advanced Business Application Programming ("ABAP") platform developed by SAP AG.

Application 200 includes client layer 210, application layer 220, and database layer 230. Client layer 210 includes user interface 212 that runs on a client computing device such as a desktop computer, laptop computer, personal digital assistant, telephone, and the like. In a Web-based environment, user interface 212 is typically a Web browser. User interface 212 may collect input from a user and provide that input to application layer 220 for processing.

Application layer 220 includes application server 222 to receive and process input from client layer 210. Application server 222 typically includes a number of subcomponents including, for example, connectivity layer 240, presentation logic 242, business logic 244, and persistence layer 246. Connectivity layer 240 provides connections to client layer 210 using protocols such as the HyperText Transfer Protocol (HTTP), HTTP secured through the Secure Socket Layer, the Simple Object Access Protocol (SOAP), and the like. The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). The SOAP protocol refers to any of the SOAP protocols including the one promulgated by the World Wide Consortium (W3C) entitled, "SOAP Version 1.1 Part 1: Messaging Framework and Part 2: Adjuncts," 24 Jun. 2003 (hereinafter, the SOAP protocol). The Secure Socket Layer protocol refers to any of the Secure Socket Layer protocols including, for example, the protocol entitled, "The SSL Protocol Ver. 3.0," Nov. 18, 1996 (the HTTPS protocol).

Presentation logic 242 generates a Graphical User Interface (GUI) using, for example, a markup language such as the Hyper Text Markup Language (HTML). Business logic 244 represents the core of the application, for example, the rules governing the underlying business process (or other functionality) provided by the application. The Java 2 Enterprise Edition Specification v1.3, published on Jul. 27, 2001 (the J2EE specification) defines an increasingly popular architecture for application layer 220.

Database 230 includes data access logic used by business logic 244 to store and retrieve data in database 232. Database 232 provides non-volatile storage (sometimes referred to as a persistent store) for the data accessed and/or processed by application layer 220. In an embodiment, database 232 is a relational database. Persistence layer 246 provides an interface between business logic 244 and data layer 230.

Persistence layer 246 includes transaction manager 252 and persistence manager 254. Transaction manager 252 is a service that manages the consistency of transactions on database 232. In an embodiment, transaction manager 252 provides a global unique transaction identifier (GTID). The persistence manager 254 will create a new row entry for each modification within this transaction with the GTID as a key field. The transaction manager 252 is able to maintain nested transaction. This enables the persistence manager 254 to commit or rollback changes to the parent transaction or to persistent data when the transaction is completed. Persistence manager 254 manages persistent object 258. In an embodiment, persistence manager 254 creates proxy classes from a database schema during design time.

In an embodiment, persistence manager 254 maintains the member data (e.g., attributes, object references, etc.) of zero or more persistent objects in its internal table. Unlike conventional object persistence mechanisms in which persistent objects serialize member data from the underlying database, persistent object 258 directly accesses the data stored in the internal table of persistence manager 254. This allows persistence manager 254 to support transactions that do not use a deep copy of object hierarchies and that perform bulk data transfer. Thus, persistence layer 246 uses less memory than conventional object persistence mechanisms.

In an embodiment, an application requests proxy object 256 from persistence layer 246. As is further described below, requests to access the member data of proxy object 256 are redirected to the internal data store of persistent object 258. This approach circumvents the disadvantages of conventional object persistence and combines high performance with less memory consumption.

Figure 3:
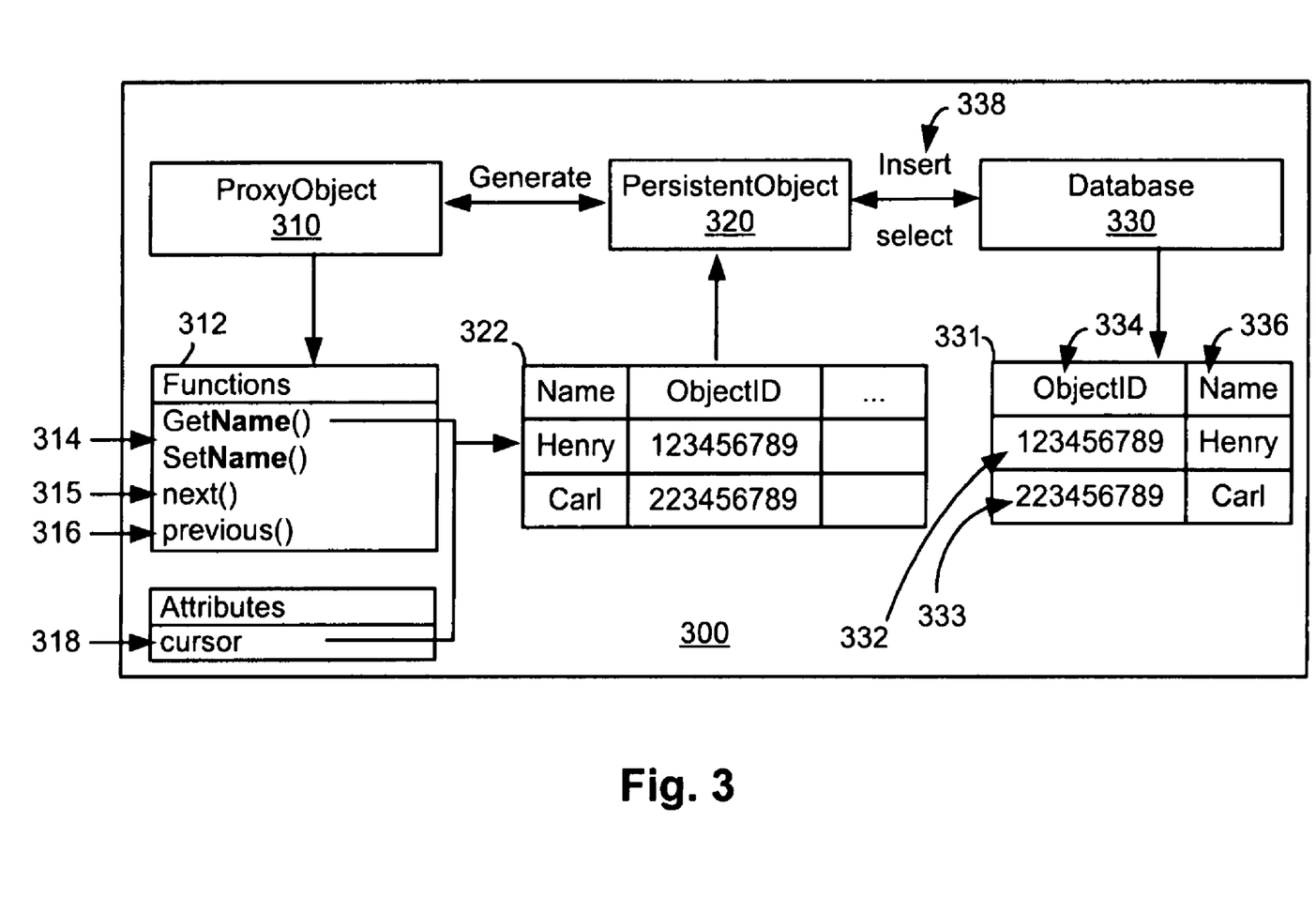
FIG. 3 is a block diagram illustrating selected aspects of an object persistence system, according to an embodiment of the invention.

FIG. 3 is a block diagram illustrating selected aspects of object persistence system 300, according to an embodiment of the invention. Object persistence system 300 includes proxy object 310, persistent object 320, and database 330. Database 330 includes database view 331. A "database view" refers to a virtual table whose contents are defined by a query that is stored and maintained on the database server (e.g., database server 234, shown in FIG. 2). Database views can be used to extract and combine selected information from one or more existing database tables. In the illustrated example, database view 331 includes, objects 332-333. Each object includes an object identifier 334 and one or more attributes (e.g., name attribute 336).

In an embodiment, a persistence layer (e.g., persistence layer 246, shown in FIG. 2) uses database access statements 338 to, for example, create database views (e.g., database view 331) and manipulate the data stored on database 330. A database connectivity Application Programming Interface (API) may be used to establish database connections and to execute the database access statements. For example the JDBC (unofficially, Java Database Connectivity) API may be used to establish database connections. Similarly, the database access statements may be based, at least in part, on the Structured Query Language (SQL). A "result set" refers to the set of data retrieved from database 330 with a database query. Typically, the data of the result set is delivered in the form of a table and may be based, at least in part, on a database view (e.g., database view 331).

Table 322 contains member data for persistent object 320. In an embodiment, table 322 is based, at least in part, on a result set that is executed on database view 331. Typically, persistent object 320 includes both data and code. The term "member data" refers to an object's data. In one embodiment, the member data is structured in a table (e.g., table 322) while in alternative embodiments, the member data may have a different structure.

Proxy object 310 is a proxy for persistent object 320. In one embodiment, proxy object 310 represents one entry of a result set (e.g., one entry of a row set). In operation, an application may request proxy object 310 from a persistence layer (e.g., persistence layer 246, shown in FIG. 2). Using proxy object 310, the application may request access to object member data corresponding to proxy object 310. In one embodiment, the request to access the object member data is redirected to the internal data store of persistent object 320 (e.g., table 322).

In an embodiment, proxy object 310 includes proxy object iterator 312. The term "iterator" refers to an interface that allows a user to navigate a collection of data. Proxy object iterator 312 implements one or more methods to navigate the member data. More precisely, since the member data is based on a result set, proxy object iterator 312 implements one or more functions (e.g., methods) to navigate the result set. In the illustrated embodiment, proxy object iterator 312 includes get/set methods 314, next method 315, and previous method 316. In an alternative embodiment, proxy object iterator 312 may include more methods, fewer methods, and/or different methods.

Cursor 318 is a pointer used to select member data from table 322. In one embodiment, the functions of proxy object iterator 312 move cursor 318 forward and backward to select member data in table 322. Once the member data is selected, the functions of proxy object iterator 312 obtain and/or change the values of member data in table 322 (e.g., using get/set methods 314).

In an embodiment, persistent object 320 stores references between objects. The term "reference" refers to a value that specifies a reference from one object to another object. In one embodiment, object references are accessed by get/set methods of proxy object iterator 312. In such an embodiment, persistent object 320 can follow the reference to access the referenced object. See context definition for restriction for references.

In an embodiment, persistent object 320 stores object aggregates. The term "object aggregate" refers to a special kind of reference. An "object aggregate" enables a developer to separately load different parts of an object. Object aggregates are useful, for example, to display only selected object information via a user interface. In addition, an object aggregate may be used to reload the rest of the object on demand. This concept helps also to establish class hierarchies. The persistence manager loads the data of the parent class in a different internal table than those of the derived class.

Typically, databases use a different namespace for stored data than the namespace used by programming languages to access and manipulate the stored data. In addition, it is frequently desirable to control access rights for persistent data (e.g., object metadata). In an embodiment, an "attribute descriptor" is used to specify a namespace for object metadata and/or to control access rights for the persistent data.

Figure 4:
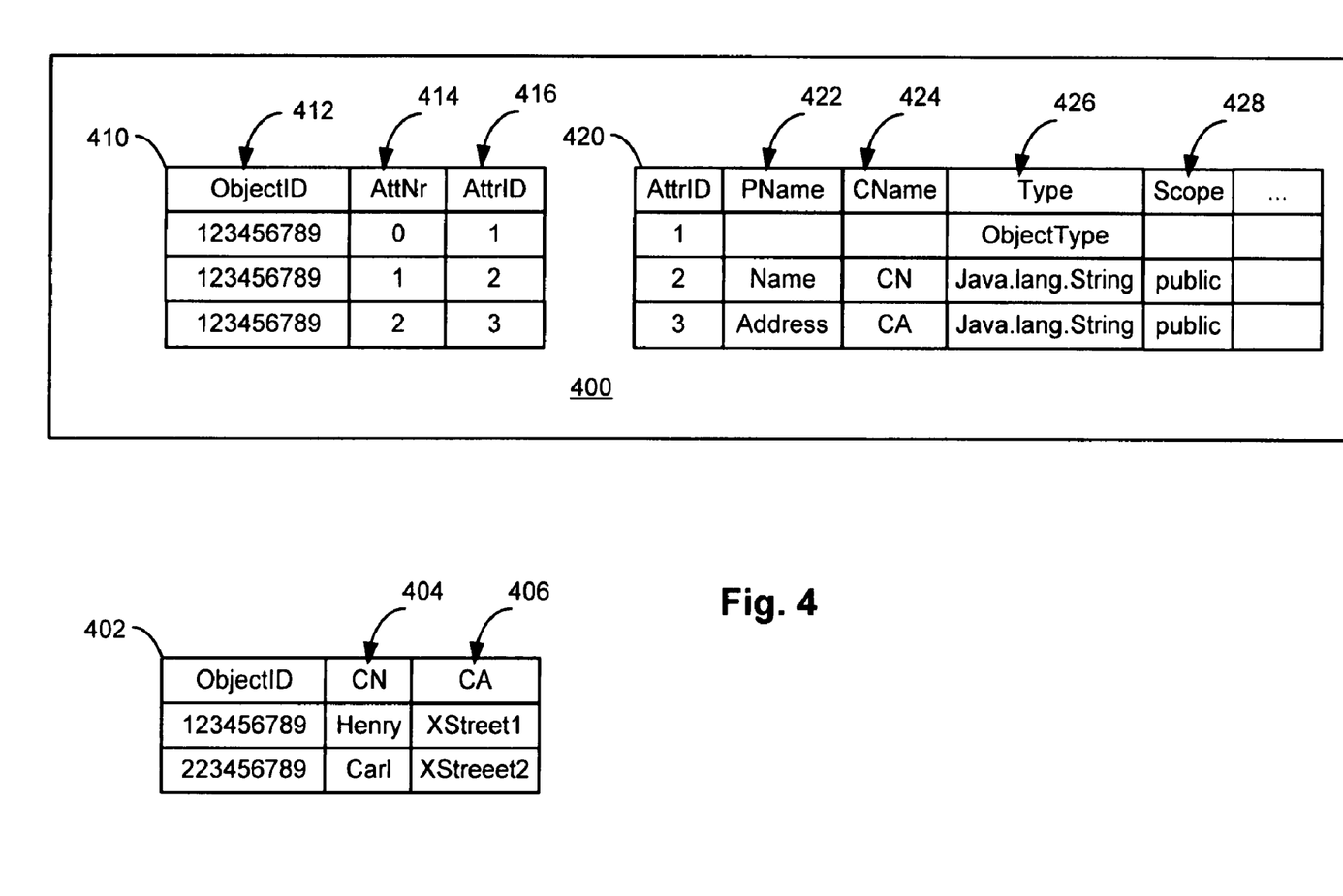
FIG. 4 is a conceptual diagram illustrating selected aspects of a database system, according to an embodiment, of the invention.

FIG. 4 is a conceptual diagram illustrating selected aspects of database system 400, implemented according to an embodiment of the invention. Object 402 is an object stored on database system 400. Object 402 includes, for example, attributes 404 and 406. Object metadata 410 stores metadata for object 402 on a database (e.g., database 330, shown in FIG. 3). For example, object metadata may include object identifier 412, attribute number 414, and attribute identifier 416. In an alternative embodiment, object metadata 410 may store more metadata, less metadata, and/or different metadata.

In an embodiment, attribute descriptor 420 specifies a programming language name (e.g., 422) and a table and column name (e.g., 424) for at least one of the attributes specified by object metadata 410. In addition, attribute descriptor 420 may specify an object type (e.g., 426) for the attribute(s). In one embodiment, attribute descriptor 420 specifies the scope of the access rights for the attribute(s) (e.g., 428). For example, attribute descriptor 420 may indicate that an attribute is "public" if it is publicly accessible or may indicate that the attribute is "private" if access to the attribute is restricted. In one embodiment, attributes that are not public are calculated properties of object 402. In an alternative embodiment, attribute descriptor 420 may include more information, less information, and/or different information. In an embodiment, attribute descriptor 420 includes an attribute entry (e.g., having an index of zero) that contains general information about object 402.

A persistence manager (e.g., persistence manager 254, shown in FIG. 2) reads attribute descriptor 420 to determine, for example, the data types and names of attributes associated with a persistent object stored in the internal data store of the persistent manager. The persistence manager may create get/set methods (e.g., get/set Name and/or get/set Address) to access columns 422 and 424.

In an embodiment, the objects accessed by the persistence manager are organized as a context. A context aggregates a set of different objects into a user defined view. In one embodiment there are the three contexts for load, read and write. The write context is defined by the parent object, which locks the transaction, in which the new object is created and is unique during its lifetime. All modify access to any object will load the write context of the object to guarantee consistent references. References to objects in other write contexts will be soft references. A soft reference is indirect and the persistence manager has to take care that the requested context is loaded before de-referencing. Therefore a write context can be dropped consistently at any time. This feature is important for the implementation of a cache. The read context can change during lifetime and can be used to group objects to logical units like tree hierarchy information.

The write context hierarchy typically includes a number of parent nodes each having zero or more child nodes. In an embodiment, transaction locks are based, at least in part, on the context hierarchy. For example, a transaction lock may not be allowed for context node, if one or more of its direct parents are already locked.

The write context hierarchy may also be used to restrict references between objects. For example, in an embodiment, persistent references (e.g., references between persistent objects) are restricted to objects that are in the same context node or in one of the child nodes descending from the context node. In one embodiment, objects that are currently referenced cannot be deleted. Instead, objects that are currently referenced are "marked" (e.g., by setting a status value) to indicate that they should be removed from the database at a later time (e.g., when the reference counter is zero).

In an embodiment, transaction management is closely coupled to the write context of the objects. For example, a transaction can lock a context (or a portion of the context) for read, write, or lazy read. In one embodiment, a transaction starts with a lock request to a given context node. The lock request is successful if no parent context nodes for the requested context node are locked. The lock is active for the given context node and all of the context nodes descending from the given context node.

In an embodiment, a persistence manager can load all of the objects belonging to a context in one select statement. The objects that are created in the context may automatically be assigned to the context. In one embodiment, the persistence manager can selectively load the child context nodes of a context node specified by a select statement. The context has many features of a prepared statement, but it maintains its result set dynamically.

Figure 5:
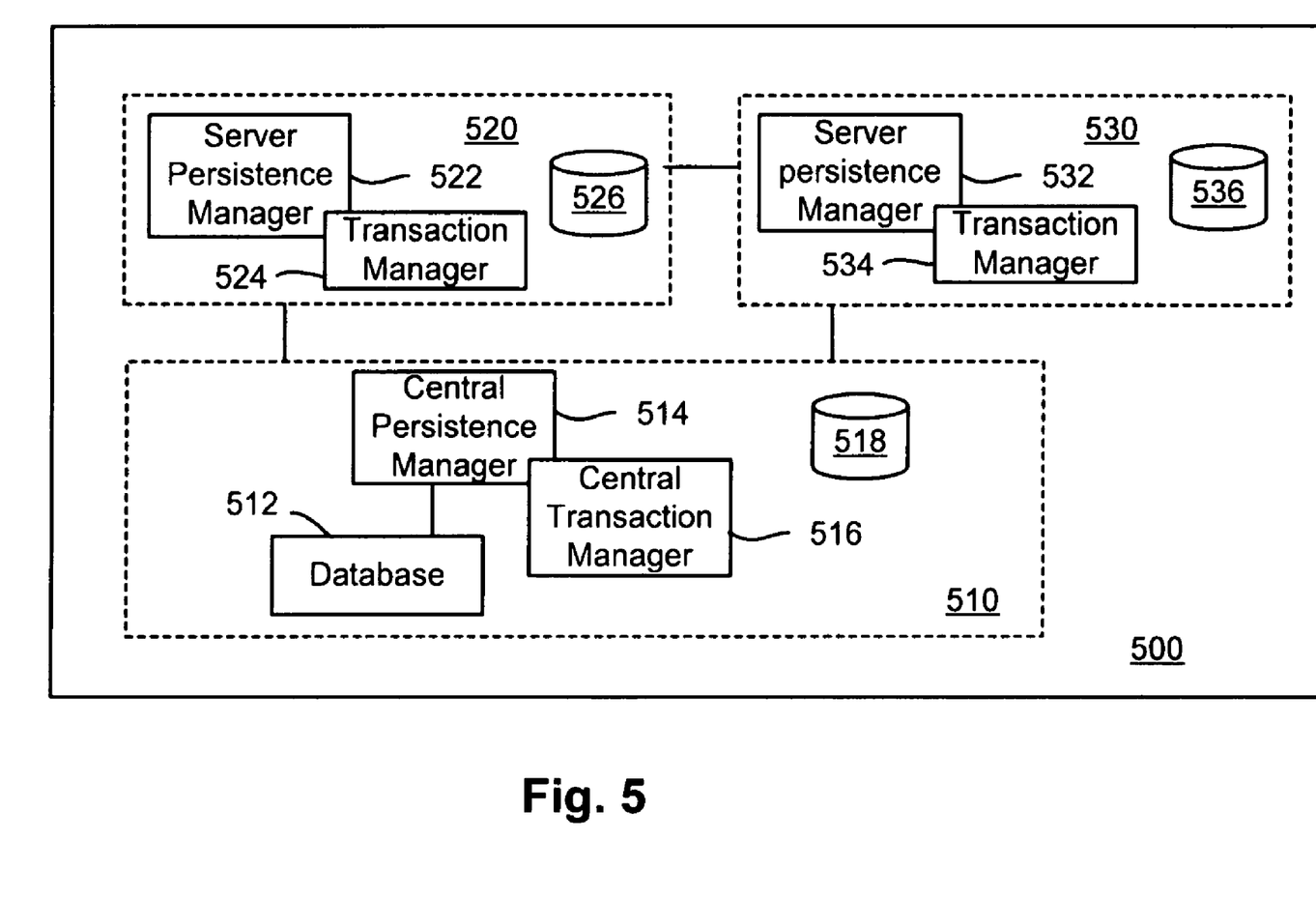
FIG. 5 is a block diagram of selected aspects of an application server cluster, according to an embodiment of the invention.

FIG. 5 is block diagram of selected aspects of application server cluster 500, according to an embodiment of the invention. Application server cluster (or simply cluster) includes central instance 510 and server instances 520 and 530. Central instance 510 maintains transaction management for server instances 520 and 530. The illustrated embodiment of central instance 510 includes database 512, central persistence manager 514, central transaction manager 516, and first level application data cache 518. In an embodiment, central persistence manager 514 manages instances of the persistence manager that are distributed on the server nodes of cluster 500. Similarly, central transaction manager 516 manages transactions through instances of the transaction manager that are distributed on the server nodes.

Server node 520 includes server node persistence manger 522 and server node transaction manager 524. Similarly, server node 530 includes server node persistence manger 532 and server node transaction manager 534. In an embodiment, server node persistence mangers 522 and 532 request data from database 512. The requested data is stored in central persistence manager 514. In an embodiment, the requested data may be organized as a context. Central transaction manager 516 issues a lock to the server instance that requested the context. In one embodiment, central persistence manager 514 caches requested contexts for subsequent accesses.

In an embodiment, a server node that owns a write lock from central transaction manager 516 can share the transaction with another server node. If, for example, server node 530 has a lock on the context "root.context," server node 520 can request a transaction lock directly from server node 530. Server node 520 can request a transaction lock for the entire context "root.context" or only a portion of the context, for example, the child context "root.context.edit." The ability to share transaction locks between server nodes allows nested transactions on one data set.

In an embodiment, one or more of the nodes within cluster 500 can install a listener that will alert the node when certain events occur. For example, a server node can install a listener on, for example, central instance 510 to listen for the completion of a transaction. When the transaction completes, the "listening" server node can request a lock for the context from central transaction manager 516.

In an embodiment, persistent object lifetime exceeds the application runtime and is closely correlated to the lifetime of the database schema. In contrast to persistent objects, the lifetime of a transient object terminates with the application. In one embodiment, instances of a persistence manager cache transient objects. For example, transient objects may be created during a transaction and may have an identifier of zero. The transient objects are not passed to the transaction manager and the schema is not passed to the database. In one embodiment, the persistence manager creates a fixed size memory block to cache the transient objects. For example, central persistence manager 514 may create first level cache 518. Similarly, server node persistence managers 522 and 532 may respectively create second level caches 526 and 536. An aging strategy may be used to determine which objects to remove when a buffer overflow occurs. In one embodiment, the persistence manager includes interfaces to sort the cached objects by, for example, attribute values.

Figure 6:
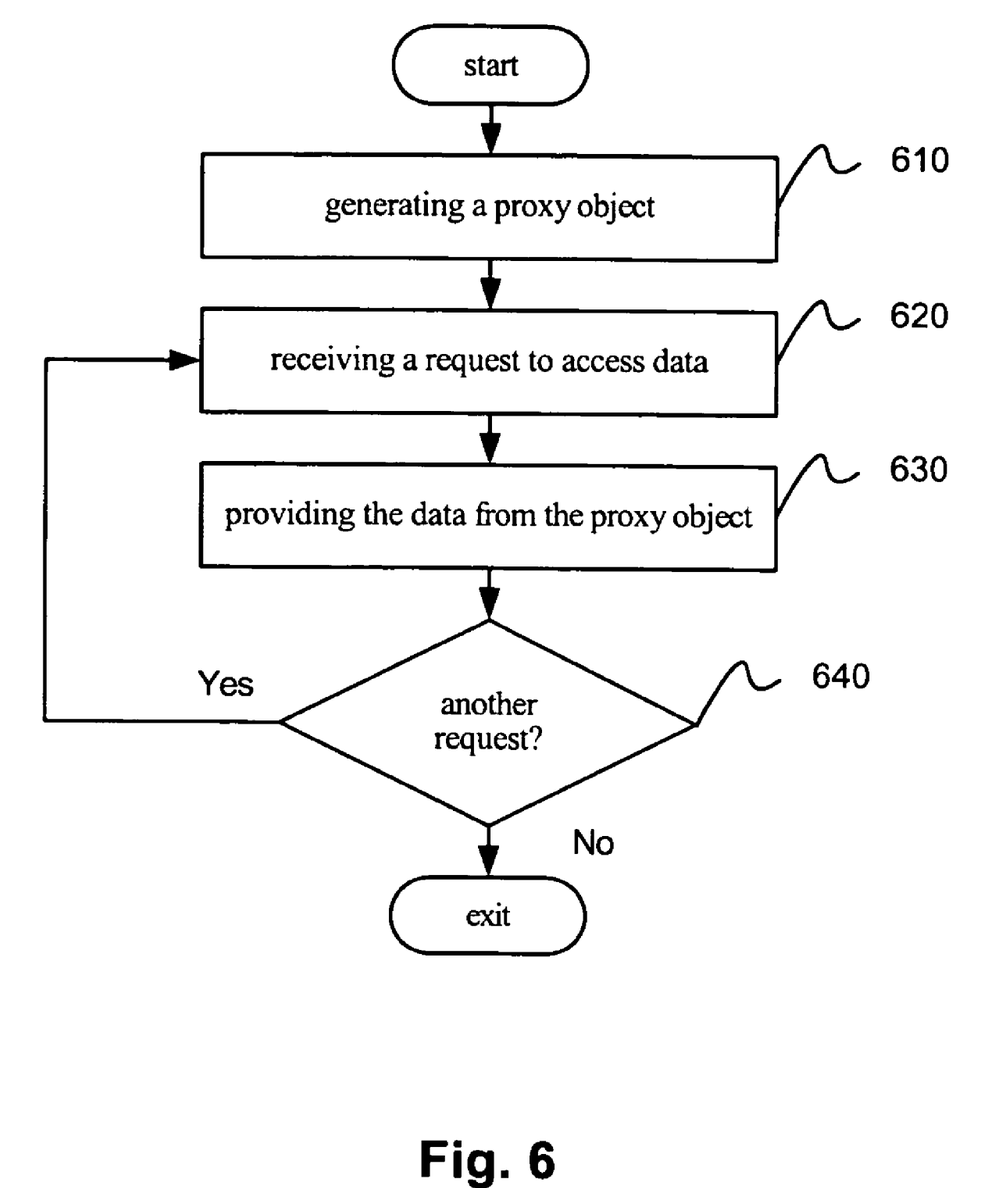
FIG. 6 is a flow diagram illustrating certain aspects of a method for object persistence, according to an embodiment of the invention.

Turning now to FIG. 6, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flow diagram illustrating certain aspects of a method for object persistence, according to an embodiment of the invention. Referring to process block 610, a persistence manager generates a proxy object (e.g., proxy object 310, shown in FIG. 3) based on the schema of the relational database. In one embodiment, the persistence manager accesses a database result set to obtain the object metadata. In such an embodiment, the proxy object is generated based, at least in part, on an entry of a row set. In one embodiment, the object metadata is stored in an attribute descriptor on the database. The attribute descriptor may specify a data type and a name for each attribute of the object.

Referring to process block 620, the persistence manager receives a request to access member data of the persistent object (e.g., persistent object 320, shown in FIG. 3) associated with the proxy object. The request may be received from an application or from services supporting the application. The persistence manager provides the requested member data at 630. The provided member data may be an object attribute and/or an object reference. The process may be repeated at 640.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method for object persistence comprising:

generating a proxy class, by a persistent manager, based on metadata stored in a relational database;

receiving, by the persistence manager, a request via a proxy object of the proxy class to access member data of the relational database;

accessing the member data from the relational database;

storing, as object aggregates, the member data from the relational database as member data of a persistent object in an internal table of the persistent manager, wherein the object aggregates to enable loading of different parts of the persistent object instead of the entire persistent object;

organizing the member data in the internal table as belonging to a context for load, read, and write transaction;

selecting the member data based on the context of the member data;

directly accessing, by the persistent object, the member data stored in the internal table of the persistent manager, the directly accessed member data belonging to the selected context; and providing the member data of the persistent object via the proxy object of the proxy class.

2. The method of claim 1, wherein generating the proxy class based on the metadata stored in the relational database comprises:

accessing from the relational database a database result set to obtain the object member data; and creating the proxy object based, at least in part, on the metadata stored in the relational database, and wherein the directly accessed member data is associated with transactions that do not require deep copy of object hierarchies.

3. The method of claim 1, further comprising:
providing, by a transaction manager coupled with the persistent manger, a global unique identifier (GTTD), the transaction manger for managing consistency of transactions in the relational database; and
creating, by the persistent manager, an entry of a row set including the GTTD to provide capability to maintain nested transactions on the relational database.

4. The method of claim 2, further comprising:
reading the metadata from an attribute descriptor, wherein the attribute descriptor is to specify a data type and a name for each object attribute.

5. The method of claim 1, wherein providing the object member data from the proxy object comprises at least one of:
providing an object attribute from the proxy object; and
providing an object reference from the proxy object.

6. The method of claim 1, further comprising:
navigating the proxy object via a proxy object iterator.

7. The method of claim 1, further comprising:
reading, at a first server instance persistence manager, persistent object associated with metadata from the relational database; and
generating another proxy class and another proxy object based, at least in part, on the metadata stored in the relational database.

8. The method of claim 7, further comprising:
providing a transactional lock for at least a portion of the other proxy object from a central instance transaction manager to a first service instance transaction manager.

9. The method of claim 8, further comprising:
providing a transactional lock for at least a portion of the other proxy object from the first server instance transaction manager to a second server instance transaction manager.

10. The method of claim 7, further comprising:
creating a fixed size memory block for the internal data store of a central instance persistence manager; and
creating a fixed size memory block for an internal data store of the first server instance persistence manager.

11. The method of claim 1, wherein the accessing based on a database view of the relational database, and wherein the database view is configured for extracting member data from one or more relational databases.

12. The method of claim 1, wherein the context aggregates the member data in sets of the load, read, and write transactions for executing a commit or a rollback.

13. The method of claim 1, further comprising:
redirecting to the internal table the request to access the member data.

14. The method of claim 1, further comprising:
determining access rights of the member data via an attribute descriptor in the internal table, the attribute descriptor specifying a programming language name, type of member data, and public and private scope of the access rights; and
selecting the member data based on the access rights.

15. The method of claim 1, further comprising:
executing a commit or a rollback on the persistent object when the transaction is complete.

16. An apparatus comprising:
an application to request member data of a persistent object; and
a processor and a logic executable thereon to perform the method including:
generating a proxy class, by a persistent manager, based on metadata stored in a relational database;
receiving, by the persistence manager, a request via a proxy object of the proxy class to access member data of the relational database;
accessing the member data from the relational database;
storing, as object aggregates, the member data from the relational database as member data of a persistent object in an internal table of the persistent manager, wherein the object aggregates to enable loading of different parts of the persistent object instead of the entire persistent object;
organizing the member data in the internal table as belonging to a context for load, read, and write transaction;
selecting the member data based on the context of the member data;
directly accessing, by the persistent object, the member data stored in the internal table of the persistent manager, the directly accessed member data belonging to the selected context; and
providing the member data of the persistent object via the proxy object of the proxy class.

17. The apparatus of claim 16, wherein the logic executable thereon to generate the proxy object based, at least in part, on object metadata stored in the relational database comprises logic to perform the method comprising:
accessing from the relational database a database result set to obtain the metadata; and
creating the proxy object based, at least in part, on the metadata obtained from the database result set, and wherein the directly accessed member data is associated with transactions that do not require deep copy of object hierarchies.

18. The apparatus of claim 16, wherein the processor and the logic to further to perform the method including:
providing, by a transaction manager coupled with the persistent manger, a global unique identifier (GTTD), the transaction manger for managing consistency of transactions in the relational database; and
creating, by the persistent manager, an entry of a row set including the GTTD to provide capability to maintain nested transactions on the relational database.

19. The apparatus of claim 17, wherein the database result set is based, at least in part, on a database view.

20. The apparatus of claim 17, wherein the logic executable thereon further comprises logic to:
reading the metadata from an attribute descriptor, wherein the attribute descriptor is to specify a data type and a name for each object attribute.

21. The apparatus of claim 16, wherein the accessing based on a database view of the relational database, and wherein the database view is configured for extracting member data from one or more relational databases.

22. The apparatus of claim 16, wherein the context aggregates the member data in sets of the load, read, and write transactions for executing a commit or a rollback.

23. The apparatus of claim 16, wherein the processor and the logic to further to perform the method including:
redirecting to the internal table the request to access the member data.

24. The apparatus of claim 16, wherein the processor and the logic to further to perform the method including:
determining access rights of the member data via an attribute descriptor in the internal table, the attribute descriptor specifying a programming language name, type of member data, and public and private scope of the access rights; and selecting the member data based on the access rights.

25. The apparatus of claim 16, wherein the processor and the logic to further to perform the method including:

executing a commit or a rollback on the persistent object when the transaction is complete.

26. An article of manufacture comprising:

a computer-readable medium having content stored thereon to provide instructions that, when executed, result in an electronic device to perform operations including:

generating a proxy class, by a persistent manager, based on metadata stored in a relational database;

receiving, by the persistence manager, a request via a proxy object of the proxy class to access member data of the relational database;

accessing the member data from the relational database;

storing, as object aggregates, the member data from the relational database as member data of a persistent object in an internal table of the persistent manager, wherein the object aggregates to enable loading of different parts of the persistent object instead of the entire persistent object;

organizing the member data in the internal table as belonging to a context for load, read, and write transaction;

selecting the member data based on the context of the member data;

directly accessing, by the persistent object, the member data stored in the internal table of the persistent manager, the directly accessed member data belonging to the selected context; and providing the member data of the persistent object via the proxy object of the proxy class.

27. The article of manufacture of claim 26, further comprising instructions that, when executed, result in the electronic device to perform further operations including:

accessing from the relational database a database result set to obtain the object metadata; and creating the proxy class and proxy object based on the metadata stored in the relational database, and wherein the directly accessed member data is associated with transactions that do not require deep copy of object hierarchies.

28. The article of manufacture of claim 26, further comprising instructions that, when executed, result in the electronic device to perform further operations including:

providing, by a transaction manager coupled with the persistent manger, a global unique identifier (GTTD), the transaction manger for managing consistency of transactions in the relational database; and creating, by the persistent manager, an entry of a row set including the GTTD to provide capability to maintain nested transactions on the relational database.

29. The article of manufacture of claim 27, wherein the database result set is based, at least in part, on a database view.

30. The article of manufacture of claim 26, wherein the accessing based on a database view of the relational database, and wherein the database view is configured for extracting member data from one or more relational databases.

31. The article of manufacture of claim 26, wherein the context aggregates the member data in sets of the load, read, and write transactions for executing a commit or a rollback.

32. The article of manufacture of claim 26, further comprising instructions that, when executed, result in the electronic device to perform further operations including:

redirecting to the internal table the request to access the member data.

33. The article of manufacture of claim 26, further comprising instructions that, when executed, result in the electronic device to perform further operations including:

determining access rights of the member data via an attribute descriptor in the internal table, the attribute descriptor specifying a programming language name, type of member data, and public and private scope of the access rights; and selecting the member data based on the access rights.

34. The article of manufacture of claim 26, further comprising instructions that, when executed, result in the electronic device to perform further operations including:

executing a commit or a rollback on the persistent object when the transaction is complete.

* * * * *